United States Patent
Chen (10) Patent No.: US 10,775,546 B2
(45) Date of Patent: Sep. 15, 2020

(54) EDGE-LIT LIGHT GUIDE PLATE WITH FRUSTOCONICALLY-SHAPED MICROSTRUCTURES

(71) Applicants: LITE-ON ELECTRONICS (GUANGZHOU) LIMITED, Guangzhou (CN); Lite-On Technology Corporation, Taipei (TW)

(72) Inventor: Kuan-Yu Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 59 days.

(21) Appl. No.: 16/033,209

(22) Filed: Jul. 12, 2018

(65) Prior Publication Data
US 2019/0302341 A1 Oct. 3, 2019

(30) Foreign Application Priority Data

Mar. 30, 2018 (CN) .......................... 2018 1 0295777

(51) Int. Cl.
*G02B 6/10* (2006.01)
*F21V 8/00* (2006.01)

(52) U.S. Cl.
CPC .......... *G02B 6/0036* (2013.01); *G02B 6/0055* (2013.01)

(58) Field of Classification Search
CPC .. G02B 6/0043; G02B 6/0011; G02B 6/0033; G02B 6/0035; G02B 6/0036; G02B 6/004; G02B 6/0058; G02B 6/0061; F21V 2200/20
See application file for complete search history.

(56) References Cited

U.S. PATENT DOCUMENTS

| | | | | |
|---|---|---|---|---|
| 5,961,198 A * | 10/1999 | Hira | ..................... | G02B 6/0036 362/621 |
| 6,183,099 B1 * | 2/2001 | Garay | ..................... | G01D 11/28 362/23.15 |
| 7,478,942 B2 * | 1/2009 | Kim | ..................... | G02B 6/0036 349/65 |

(Continued)

FOREIGN PATENT DOCUMENTS

| | | |
|---|---|---|
| CN | 1192275 | 3/2005 |
| CN | 102425763 | 4/2012 |

(Continued)

OTHER PUBLICATIONS

"Office Action of China Counterpart Application", dated Apr. 29, 2020, p. 1-p. 9.

*Primary Examiner* — Ismael Negron
(74) *Attorney, Agent, or Firm* — JCIPRNET (57) ABSTRACT

A light guide plate includes a plate body with a first surface, a second surface opposite to the first surface, and a side surface connecting the first surface and the second surface and defining a plate thickness; a light source arranged to project light into the side surface of the light guide plate; and a plurality of microstructures arranged periodically on the first surface and indented from the first surface towards the second surface to define an indentation depth of less than half the plate thickness. Each of the light-uniformity microstructures substantially has a shape of an inverted truncated cone.

7 Claims, 7 Drawing Sheets

(56) References Cited

U.S. PATENT DOCUMENTS

| | | | | |
|---|---|---|---|---|
| 7,936,956 B2* | 5/2011 | Marttila | ............ | B29D 11/00663 |
| | | | | 362/620 |
| 7,965,350 B2* | 6/2011 | Tsuchiya | .............. | G02B 6/0036 |
| | | | | 349/65 |
| 8,322,874 B2* | 12/2012 | Ender | .................. | G02B 6/0065 |
| | | | | 362/602 |
| 8,870,432 B2* | 10/2014 | Wu | ...................... | G02B 6/0036 |
| | | | | 362/606 |
| 8,950,923 B2* | 2/2015 | Minami | ................ | G02F 1/1336 |
| | | | | 362/612 |
| 10,048,431 B2* | 8/2018 | Lee | ...................... | G02B 6/0036 |
| 10,107,951 B2* | 10/2018 | Lu | ........................ | G02B 6/0001 |
| 2004/0228112 A1* | 11/2004 | Takata | ................. | G02B 6/0036 |
| | | | | 362/601 |
| 2017/0254946 A1 | 9/2017 | Starkey | | |

FOREIGN PATENT DOCUMENTS

| | | |
|---|---|---|
| CN | 204515180 | 7/2015 |
| CN | 105676341 | 6/2016 |
| CN | 105807360 | 7/2016 |
| CN | 105929481 | 9/2016 |
| WO | 2017031035 | 2/2017 |

* cited by examiner

EDGE-LIT LIGHT GUIDE PLATE WITH FRUSTOCONICALLY-SHAPED MICROSTRUCTURES

CROSS REFERENCE TO RELATED APPLICATION

This application claims the priority benefit of China application serial no. 201810295777.3, filed on Mar. 30, 2018. The entirety of the above-mentioned patent application is hereby incorporated by reference herein and made a part of specification.

BACKGROUND OF THE INVENTION

Field of the Invention

The invention relates to a light guide plate and a light source module, and particularly relates to a light guide plate and a light source module having microstructures for light uniformity.

Description of Related Art

Since light emitted by street lamps has a high-brightness at certain angles. The high-brightness light and ambient light at night have a great brightness difference, which is rather dazzling for human eyes, and is easy to cause a glare problem to increase dangerousness. Therefore, to reduce a possibility of glare occurrence for the improvement of road safety is very important for pedestrians or drivers on the road.

SUMMARY OF THE INVENTION

The invention is directed to a light guide plate and a light source module, which are adapted to improve a glare problem to prevent human eyes from feeling uncomfortable.

An embodiment of the invention provides a light guide plate including a plate body and a plurality of light-uniformity microstructures. The plate body has a plate thickness and includes a first surface, a second surface opposite to the first surface and a side surface connected between the first surface and the second surface. The light-uniformity microstructures are arranged periodically on the first surface. The light-uniformity microstructures are indented from the first surface towards the second surface to define an indentation depth. Each of the light-uniformity microstructures substantially has a shape of an inverted truncated cone. The indentation depth is less than a half of the plate thickness.

Another embodiment of the invention provides a light source module including a light guide plate, at least one light source and a reflection layer. The light guide plate includes a plate body and a plurality of light-uniformity microstructures. The plate body has a plate thickness and includes a first surface, a second surface opposite to the first surface and a side surface connected between the first surface and the second surface. The light-uniformity microstructures are arranged periodically on the first surface. The light-uniformity microstructures are indented from the first surface towards the second surface to define an indentation depth. Each of the light-uniformity microstructures substantially has a shape of an inverted truncated cone. The indentation depth is less than a half of the plate thickness. At least one light source provides a light beam and is configured at the side surface of the plate body. The reflection layer is configured on the first surface of the plate body to reflect light, wherein the light beam is incident from the side surface and a transmission path is changed through the light-uniformity microstructures and the reflection layer, and the light beam is emitted out from the second surface.

Based on the above description, the light guide plate of the invention includes the plate body and a plurality of the light-uniformity microstructures indented from the first surface of the plate body towards the second surface to define the indentation depth, and the indentation depth is less than a half of the plate thickness. Therefore, the light beam is adapted to be incident from the side surface of the plate body, a transmission path is changed through the light-uniformity structure and the reflection layer, and the light beam is emitted out from the second surface. In this way, a light angle distribution of the light source module is more uniform, so as to reduce the glare problem to prevent human eyes from feeling uncomfortable.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
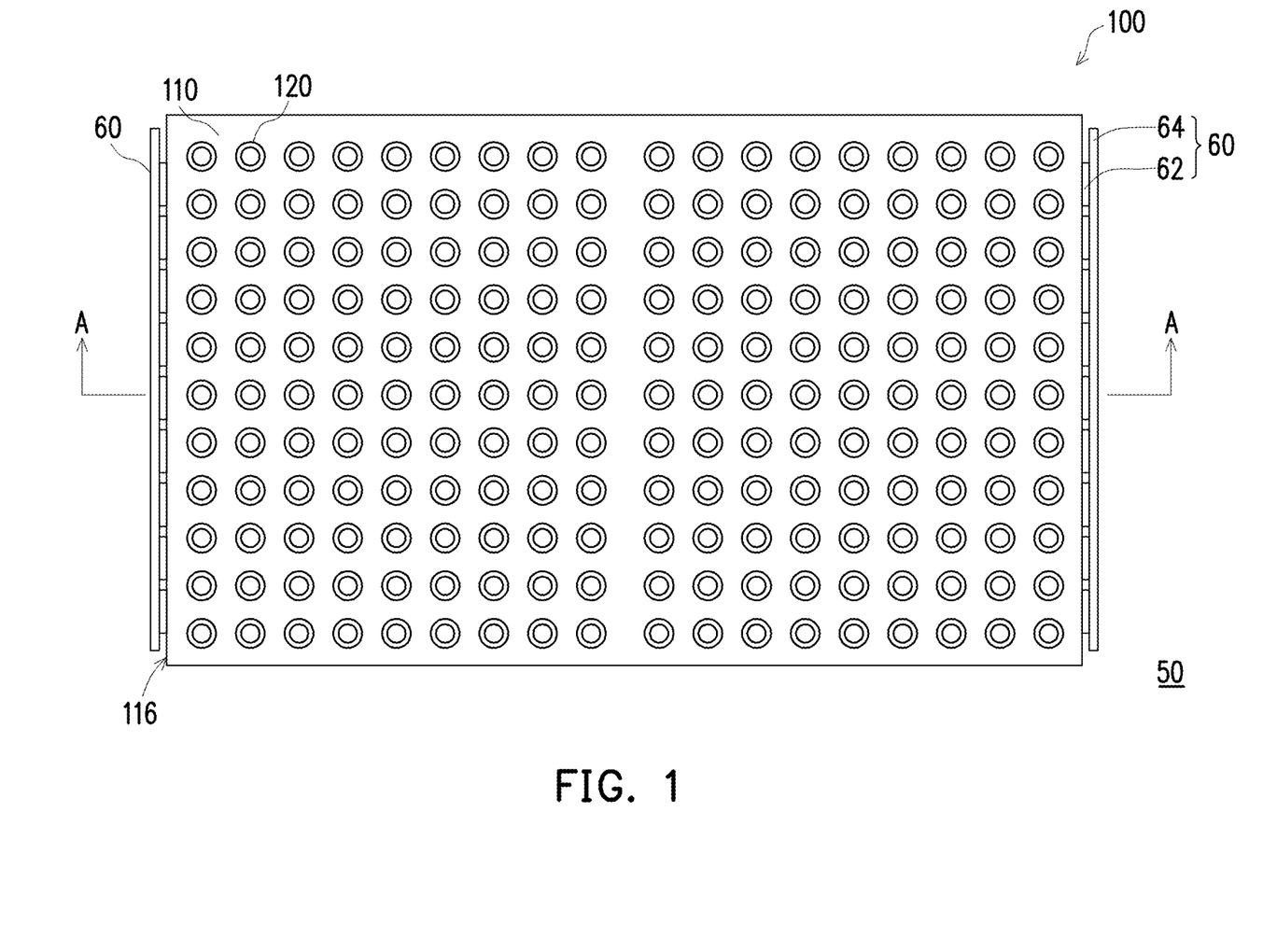
FIG. 1 is a top view of a light source module according to an embodiment of the invention.
Figure 2:
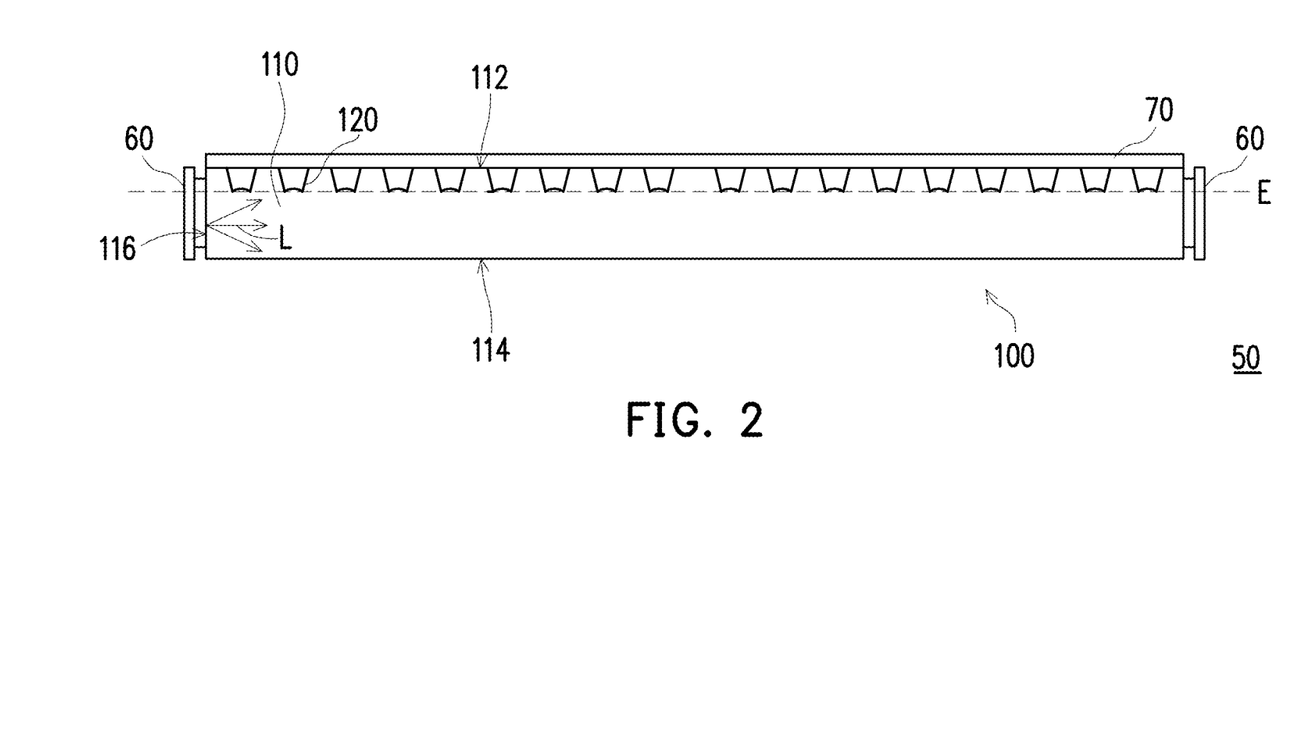
FIG. 2 is a cross-sectional view of the light source module of FIG. 1 along a section line A-A.

FIG. 1 is a top view of a light source module according to an embodiment of the invention. FIG. 2 is a cross-sectional view of the light source module of FIG. 1 along a section line A-A. In the embodiment, the light source module 50 includes a Light Guide Plate (LGP) 100, at least one light source 60 and a reflection layer 70. The at least one light source 60 emits a light beam L to the LGP 100, and a transmission path of the light beam L is changed in the LGP 100, so as to change an angle distribution of light energy emitted by the light source module 50. The light source module 50 is, for example, applied to a small lighting device, for example, a general road lighting device or other similar lighting devices, though the invention is not limited thereto.

The LGP 100 includes a plate body 110 and a plurality of light-uniformity microstructures 120. The plate body 110 has a plate thickness H1, and the plate body 110 includes a first surface 112, a second surface 114 opposite to the first surface 112 and a side surface 116 connected between the first surface 112 and the second surface 114.

The light source 60 is disposed at the side surface 116 of the plate body 110, and the reflection layer 70 is disposed on the first surface 112 of the plate body 110. The light source 60 is, for example, composed of a plurality of lighting-emitting elements 62 configured on a circuit board 64, and the light emitting elements 62 are, for example, light-emitting diodes (LEDs), though the invention is not limited thereto. The light beam L provided by the light source 60 enters the LGP 100 from the side surface 116 and changes a transmission direction near the first surface 112, and is emitted out from the second surface 114.

Figure 3:
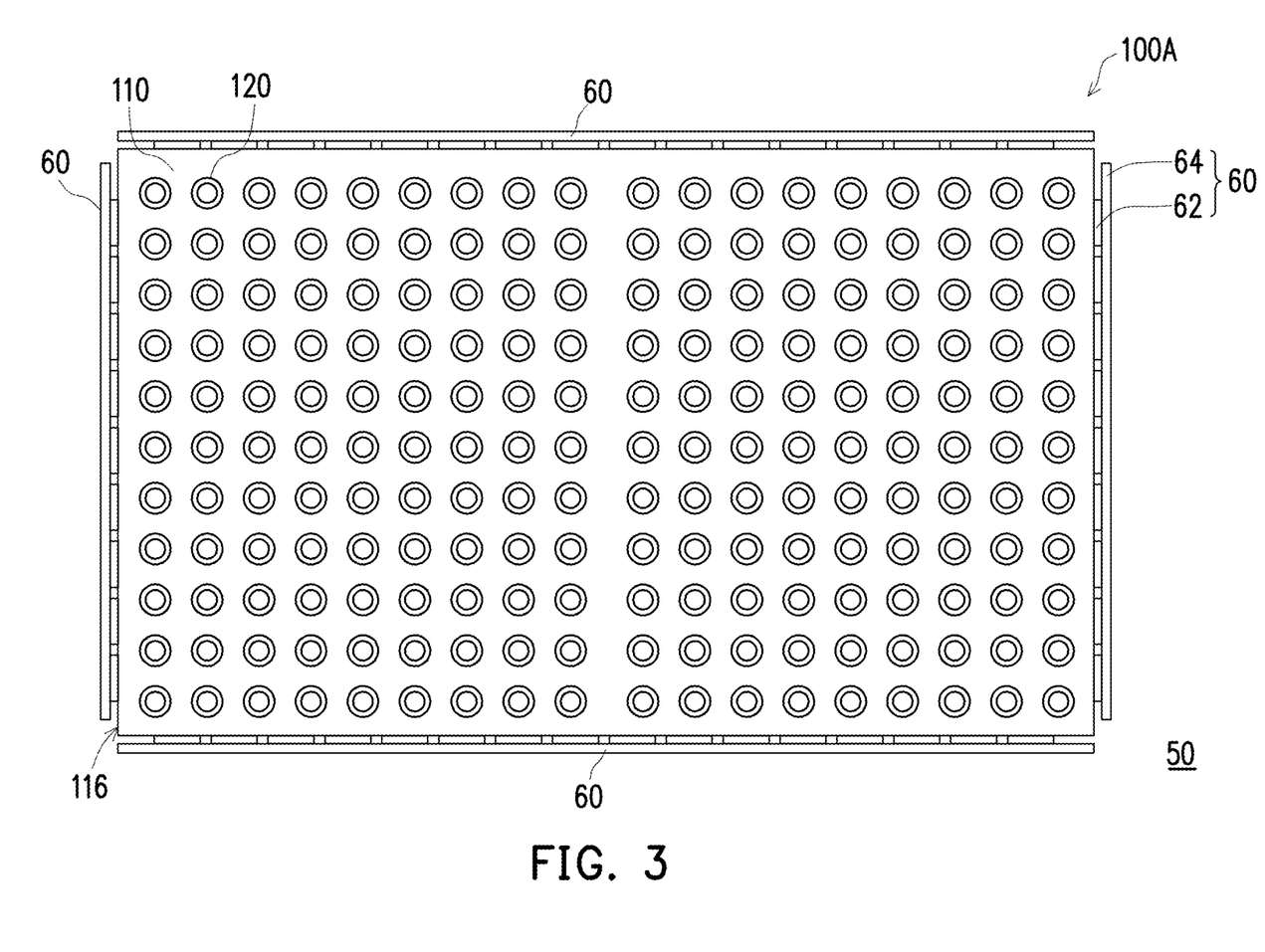
FIG. 3 is a top view of a light source module according to another embodiment of the invention.

In the present embodiment, the two light sources 60 are disposed at the two opposite side surfaces 116 of the LGP 100, and provide the light beam L to a center of the LGP 100. FIG. 3 is a top view of a light source module according to another embodiment of the invention. Referring to FIG. 3, in the embodiment, four light sources 60 may be configured at four side surfaces 116 of the LGP 100A, or configuration of the light sources 60 may be adjusted according to a profile of the plate body 110, which is not limited by the invention.

Figure 4:
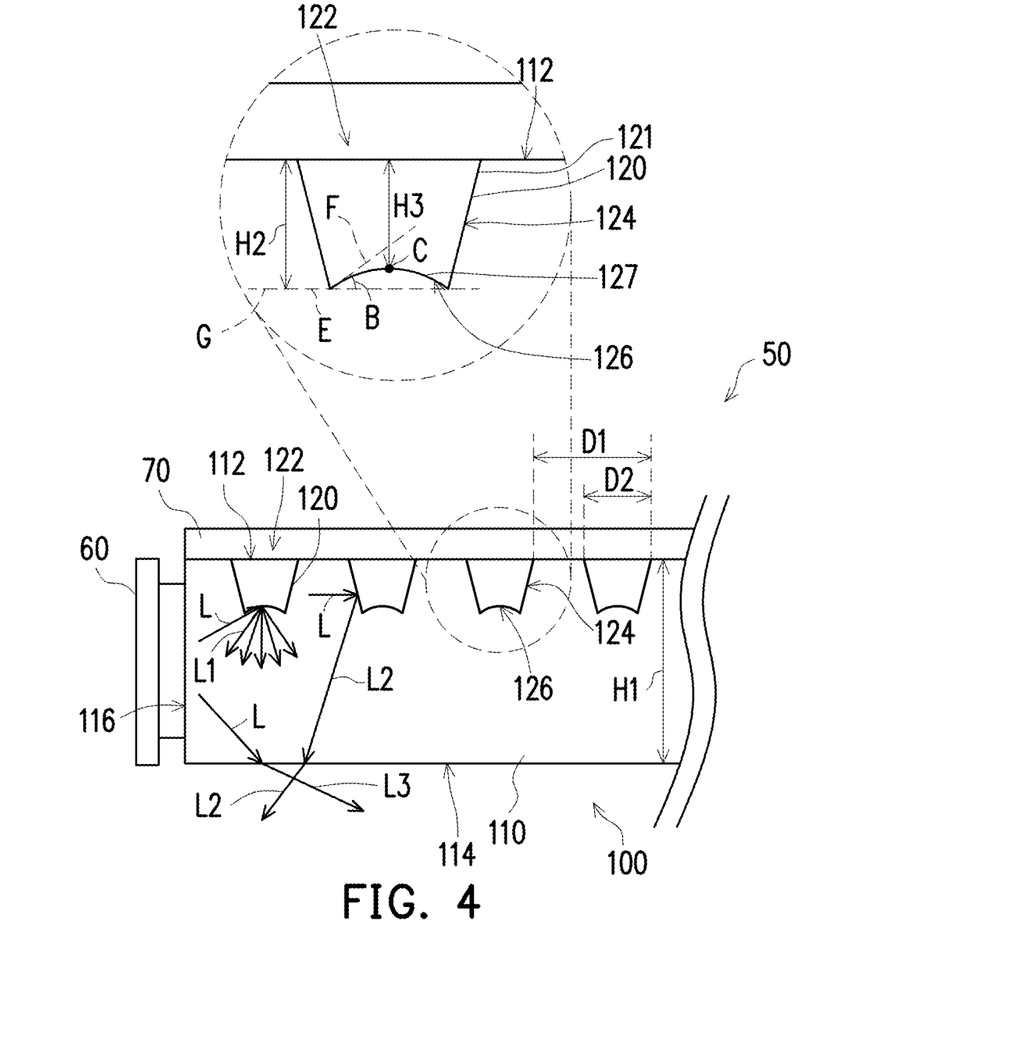
FIG. 4 is a partial enlarged view of the light source module of FIG. 2.

FIG. 4 is a partial enlarged view of the light source module of FIG. 2. Referring to FIG. 1, FIG. 2 and FIG. 4, the light-uniformity microstructures 120 are located on the first surface 112 of the plate body 110, and are arranged periodically. In detail, the light-uniformity microstructures 120 are indented from the first surface 112 towards the second surface 114 to define an indentation depth H2, and each of the light-uniformity microstructures 120 substantially has a shape of an inverted truncated cone 121, and each of the inverted truncated cone 121 forms an opening 122 at the first surface 112.

Each of the inverted truncated cones 121 includes a surrounding surface 124 and a bottom surface 126, and the surrounding surface 124 is connected between the bottom surface 126 and the first surface 112. An area of the opening 122 is greater than an area of the bottom surface 126, and the bottom surface 126 is a circular arc surface 127 protruding towards the first surface 112, for example, a spherical surface. In other words, the surrounding surface 124 is a conical surface inclined inward from the opening 122 to the bottom 126. In the present embodiment, the bottom surface 126, for example, has a circular arc shape, and the surrounding surface 124 is a circular conical surface. In other embodiment, the bottom surface 126 may be a three-dimensional (3D) shape formed by a plurality of polygonal planes, irregularly shaped planes, or free-form curved surfaces, and the surrounding surface 124 is a 3D shape formed by the polygonal planes, the irregularly shaped planes, or the free-form curved surfaces, though the invention is not limited thereto.

In other words, the light beam L is incident from the side surface 116 of the plate body 110, the transmission path is changed through the first surface 112 or the light-uniformity microstructures 120, and the light beam L is emitted out from the second surface 114. For example, the light beam L may be transmitted to the first surface 112 of the plate body 110, and is reflected by the reflection layer 70 disposed on the first surface 112 and emitted out from the second surface 114. Moreover, the light beam L may be transmitted to the light-uniformity microstructures 120, and is scattered by the bottom surfaces 126 and emitted out from the second surface 114, as shown by a light beam L1 of FIG. 4. Alternatively, the light beam L may be transmitted to the light-uniformity microstructures 120 in the plate body 110, and is reflected by the surrounding surfaces 124 and emitted out from the second surface 114, as shown by a light beam L2 of FIG. 4. Alternatively, the light beam L is directly transmitted from the side surface 116 to the second surface 114 and emitted out from the second surface 114, as shown by a light beam L3 of FIG. 4. In this way, a light angle distribution of the light source module 50 is more uniform, so as to reduce the glare problem to prevent human eyes from feeling uncomfortable.

In the present embodiment, the plate body 110 has the plate thickness H1, and the indentation depth H2 of the light-uniformity microstructure 120 is smaller than the plate thickness H1. To be specific, the plate thickness H1 of the plate body 110 is greater than 15 mm, and the indentation depth H2 of the light-uniformity microstructure 120 is less than a half of the plate thickness H1 of the plate body 110. In some embodiments, the plate thickness H1 of the plate body 110 may be greater than or equal to 75 times the indentation depth H2. Moreover, the bottom surface 126 is a circular arc surface, and an included angle B between a tangent plane F to an edge of the circular arc surface and a horizontal plane E defined by a horizontal line G ranges between 10 degrees and 70 degrees, and a distance H3 between an apex C of the circular arc surface and the horizontal plane E is between 0.05 mm and 0.75 mm. Moreover, the vertical distance H3 between the apex C of the bottom surface 126 and the horizontal plane E is smaller than a half of the indentation depth H2 of the light-uniformity microstructure 120.

Besides, in the present embodiment, the light-uniformity microstructures 120 are arranged periodically on the first surface 112, for example, arranged in an array. However, in other embodiments, the light-uniformity microstructures 120 may also be arranged in a non-array manner, for example, arranged in a gradient manner, though the invention is not limited thereto. For example, in the present embodiment, a distance D1 between two adjacent light-uniformity microstructures 120 is greater than a diameter D2 of the opening 122 of a single light-uniformity microstructure 120. For example, the distance D1 between two adjacent light-uniformity microstructures 120 is greater than twice of the diameter D2 of the opening 122 of a single light-uniformity microstructure 120, though the invention is not limited thereto. In this way, a better effect for reducing the glare problem is achieved.

Figure 5:
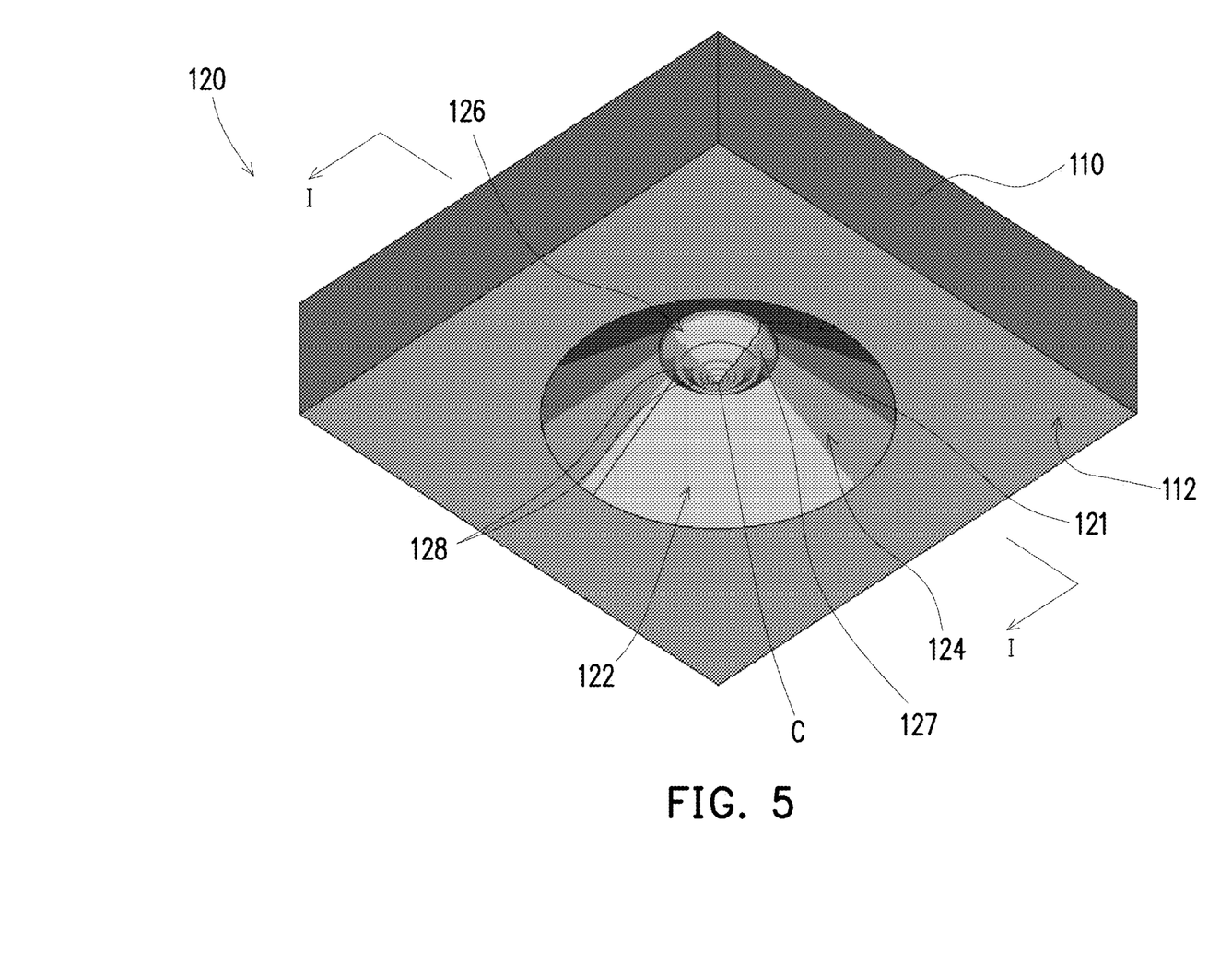
FIG. 5 is a three-dimensional view of a light-uniformity microstructure according to an embodiment of the invention.
Figure 6:
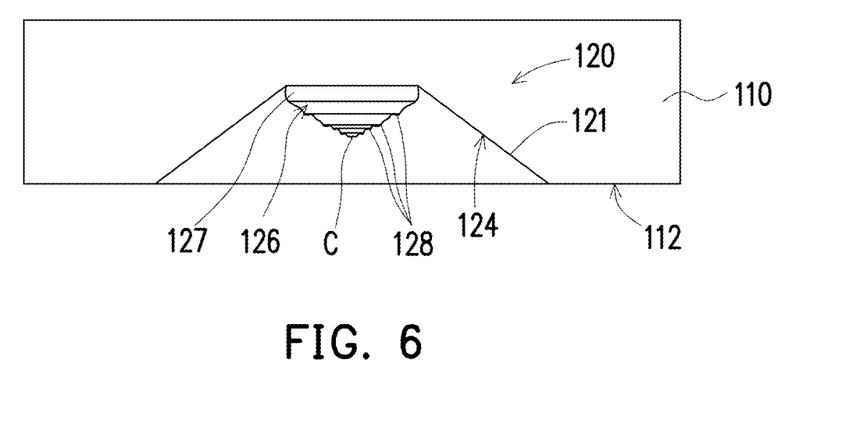
FIG. 6 is a cross-sectional view of the light-uniformity microstructure of FIG. 5 along a section line I-I.

FIG. 5 is a three-dimensional view of a light-uniformity microstructure according to an embodiment of the invention. FIG. 6 is a cross-sectional view of the light-uniformity microstructure of FIG. 5 along a section line I-I. For simplicity's sake, only one light-uniformity microstructure 120 is illustrated in FIG. 5. Referring to FIG. 5 and FIG. 6, in the embodiment, optical microstructures 128 are further configured on the bottom surface 126. Shapes of the optical microstructures 128 include arbitrary polygons, irregular shapes or free-form curved surfaces. For example, the shape of the optical microstructure 128 is a ring-shaped protrusion, though the invention is not limited thereto. Therefore, when the light beam irradiates the inverted truncated cone 121, a reflection angle range and evenness of the reflected light beam may be increased through the optical microstructures 128. In this way, a better effect of reducing the glare problem is achieved.

Figure 7A:
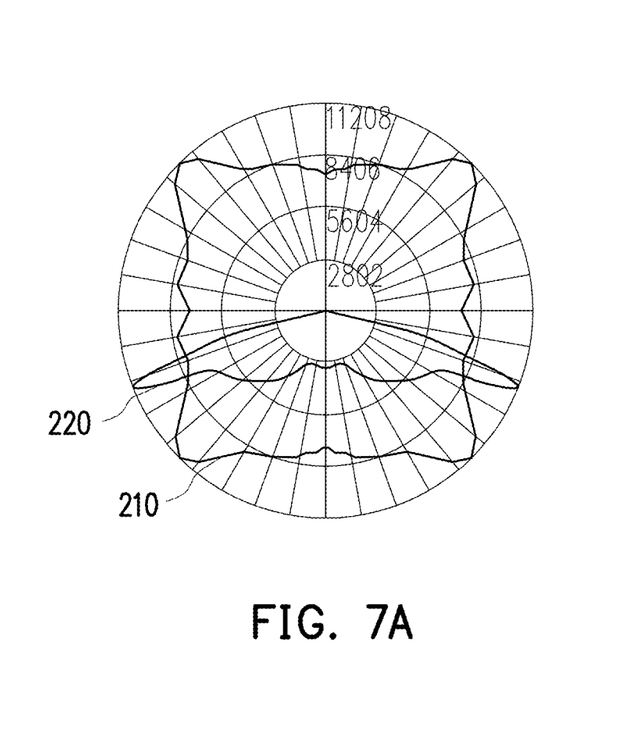
FIG. 7A is a schematic diagram of light distribution curves of a light source module of the existing technique.

FIG. 7A is a schematic diagram of light distribution curves of a light source module of the existing technique. Referring to FIG. 7A, a distance between curves 210, 220 and a central point represents a light intensity performance of a located angle. The curve 210 is a light distribution curve of an illumination beam provided by a light source of the light source module of the existing technique, and the curve 220 is a light distribution curve of the illumination beam emitted by the same light source module. According to FIG. 7A, it is known that the curve 220 has a larger light energy at specific angles, which is liable to cause the glare problem to make human eyes to feel uncomfortable. In other words, the illumination beam provided to environment by the light source module of the existing technique is not uniform within an angle range.

Figure 7B:
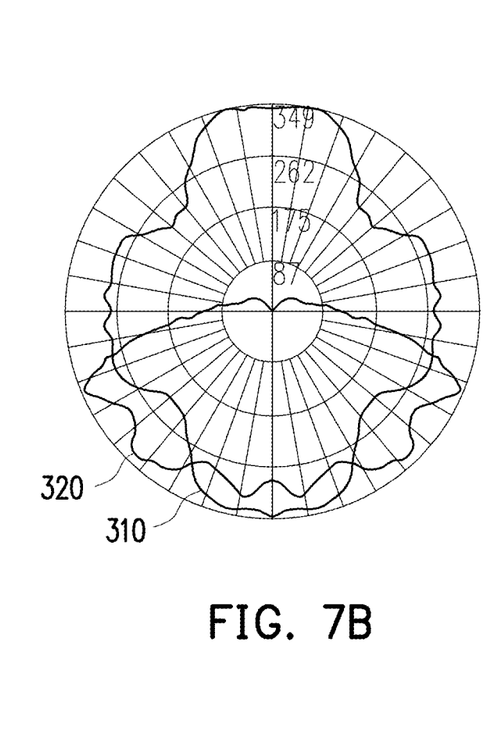
FIG. 7B is a schematic diagram of light distribution curves of the light source module of FIG. 1.

FIG. 7B is a schematic diagram of light distribution curves of the light source module of FIG. 1. Referring to FIG. 7A and FIG. 7B, a distance between curves 310, 320 and a central point represents a light intensity performance of a located angle. The curve 310 is a light distribution curve of an illumination beam provided by a light source of the light source module of the invention, and the curve 320 is a light distribution curve of the illumination beam emitted by the same light source module. According to FIG. 7B, it is known that the curve 320 of FIG. 7B has similar light energy in a large angle range compared to the curve 220 of FIG. 7A, so that the glare problem may be reduced to prevent human eyes from feeling uncomfortable.

In summary, the light guide plate of the invention includes the plate body and a plurality of the light-uniformity microstructures indented from the first surface of the plate body towards the second surface to define the indentation depth, and the indentation depth is less than a half of the plate thickness. Therefore, the light beam is adapted to be incident through the side surface of the plate body, a transmission path through the light-uniformity structure and the reflection layer is changed, and the light beam is emitted out from the second surface. In this way, a light angle distribution of the light source module is more uniform, so as to reduce the glare problem to prevent human eyes from feeling uncomfortable.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A light guide plate, comprising:
    a plate body having a plate thickness, the plate body comprising a first surface, a second surface opposite to the first surface and a side surface connected between the first surface and the second surface; and
    a plurality of light-uniformity microstructures arranged periodically on the first surface, wherein the plurality of light-uniformity microstructures are indented from the first surface towards the second surface to define an indentation depth, each of the plurality of light-uniformity microstructures substantially has a shape of an inverted truncated cone, and the indentation depth is less than a half of the plate thickness,
    wherein the inverted truncated cone comprises a bottom surface and a surrounding surface, the bottom surface is non-planar, and the surrounding surface is connected to the bottom surface and the first surface of the plate body, and
    the bottom surface is a circular arc surface protruding towards the first surface, and an included angle between a tangent plane to an edge of the circular arc surface and a horizontal plane defined by a base plane ranges between 10 degrees and 70 degrees, the base plane defined by a boundary between the bottom surface and the surrounding surface, and being parallel to the first surface.

2. The light guide plate as claimed in claim 1, wherein the inverted truncated cone form an opening at the first surface, and a distance between two adjacent light-uniformity microstructures is greater than a diameter of the opening.

3. The light guide plate as claimed in claim 1, wherein the plate thickness is greater than or equal to 75 times the indentation depth.

4. The light guide plate as claimed in claim 1, wherein a distance between an apex of the circular arc surface and the base plane is greater than 0.05 mm.

5. The light guide plate as claimed in claim 4, wherein the distance between the apex of the circular arc surface and the base plane is smaller than 0.75 mm.

6. A light source module, comprising:
    a light guide plate, comprising:
    a plate body having a plate thickness, the plate body comprising a first surface, a second surface opposite to the first surface and a side surface connected between the first surface and the second surface; and
    a plurality of light-uniformity microstructures, arranged periodically on the first surface, wherein the plurality of light-uniformity microstructures are indented from the first surface towards the second surface to define an indentation depth, and each of the plurality of light-uniformity microstructures substantially has a shape of an inverted truncated cone, and the indentation depth is less than a half of the plate thickness,
    wherein the inverted truncated cone comprises a bottom surface and a surrounding surface, the bottom surface is non-planar, and the surrounding surface is connected to the bottom surface and the first surface of the plate body;
    at least one light source providing a light beam and configured at the side surface of the plate body; and
    a reflection layer configured on the first surface of the plate body to reflect light,
    wherein the light beam is incident from the side surface of the plate body, a transmission path of the light is changed through the light-uniformity microstructures and the reflection layer, and the light beam is emitted out from the second surface,
    wherein the bottom surface is a circular arc surface protruding towards the first surface, and an included angle between a tangent plane to an edge of the circular arc surface and a horizontal plane defined by a base plane ranges between 10 degrees and 70 degrees, the base plane defined by a boundary between the bottom surface and the surrounding surface, and being parallel to the first surface.

7. The light source module as claimed in claim 6, wherein two light sources are respectively disposed at two side of the light guide plate.

* * * * *